United States Patent [19]
DeMattie et al.

[11] 3,871,924
[45] Mar. 18, 1975

[54] BATTERY HOUSING WITH HANDLE FOR STACKING

[76] Inventors: David A. DeMattie, 18110 Carol Dr., Strongsville, Ohio 44136; Anthony Fago, 4473 W. 137th St., Cleveland, Ohio 44135

[22] Filed: May 25, 1973

[21] Appl. No.: 363,890

[52] U.S. Cl.................... 136/166, 16/125, 136/170, 136/181, D26/6
[51] Int. Cl........................ H01m 1/02, H01m 1/04
[58] Field of Search...... 136/166, 170, 181; 16/125; D26/6; 214/10.5 R; 29/184

[56] References Cited
UNITED STATES PATENTS

| | | | |
|---|---|---|---|
| 1,080,852 | 12/1913 | Snyder et al. | 136/166 X |
| 1,469,119 | 9/1923 | Stallings | 136/181 X |
| 2,157,139 | 5/1939 | Mirick | 136/166 |
| 2,170,750 | 8/1939 | Foster | 136/181 |
| 2,296,038 | 9/1942 | King | 136/170 |
| 2,453,835 | 11/1948 | Donkin | 136/166 X |
| 2,710,220 | 6/1955 | Rupp | 136/181 X |
| 3,077,509 | 2/1963 | Broussard | 136/170 |
| 3,369,940 | 2/1968 | Slautterback | 136/177 |
| 3,770,511 | 11/1973 | Winterbottom et al. | 136/166 X |
| D164,903 | 10/1951 | Edelmann | D26/6 |

*Primary Examiner*—Allen B. Curtis
*Assistant Examiner*—Thomas A. Waltz
*Attorney, Agent, or Firm*—Fay & Sharpe

[57] ABSTRACT

The specification and drawings disclose an improved battery casing for automotive-type wet cell storage batteries. The specific embodiment disclosed comprises a molded plastic housing which holds the plates and electrolyte. The housing has a generally rectangular shape with the usual terminal posts and vent opening covers extending upwardly above the top wall. Mounted on the top wall and formed integrally with the casing is a handle member which has an upper portion spaced from the top surface of the battery to provide a recess into which the human hand can fit for gripping and lifting the battery. The top surface of the handle member is at the same elevation as the top surfaces of the terminal posts. Additionally, the handle member and the terminal posts are located so their top surfaces define three nonaligned support surfaces spaced such that the bottom wall of a second battery of similar configuration can be rested thereon and supported on the tops of the handle and the terminal posts. This permits the batteries to be stacked for shipment and storage without the use of special packing cases and the like.

5 Claims, 4 Drawing Figures

PATENTED MAR 18 1975 3,871,924
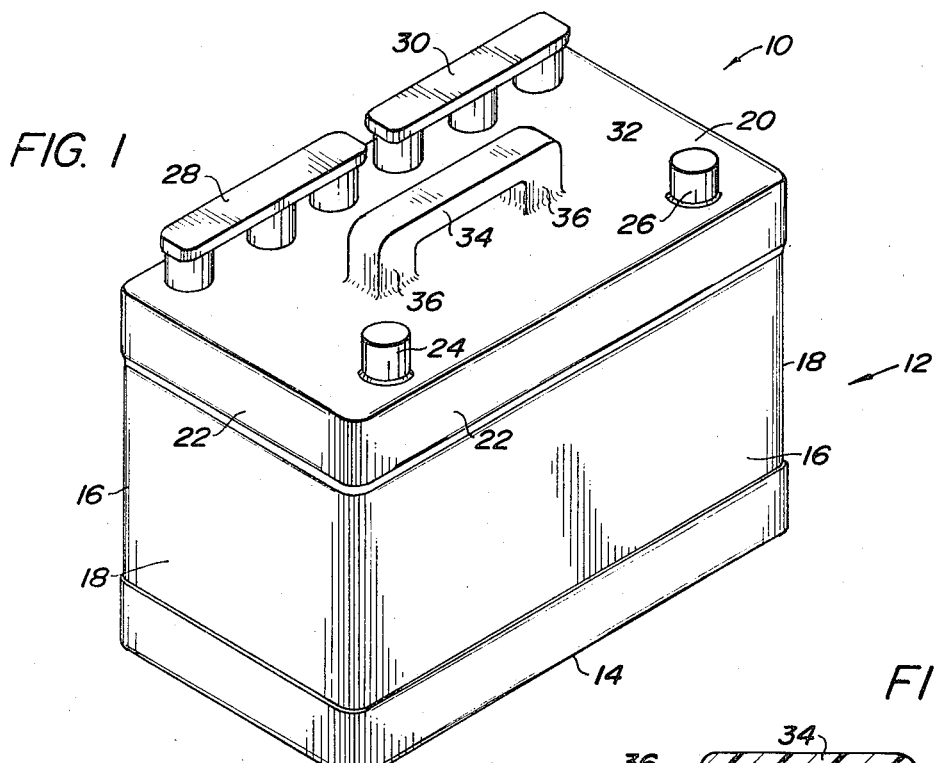
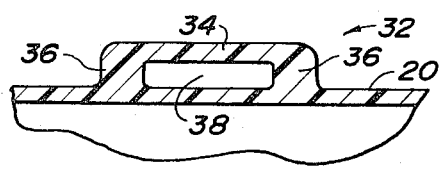
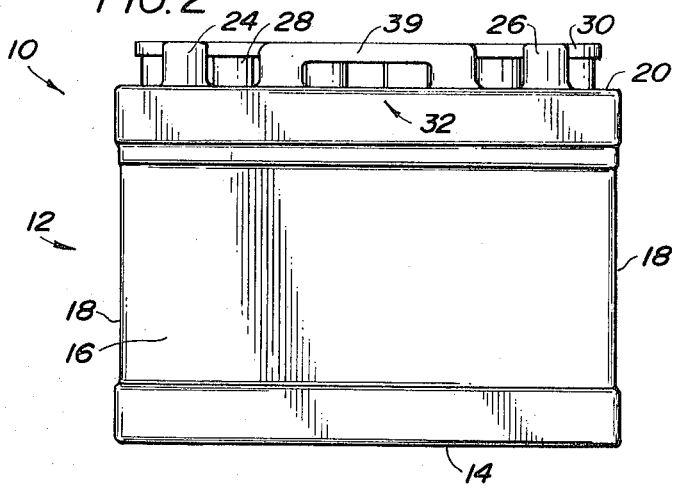
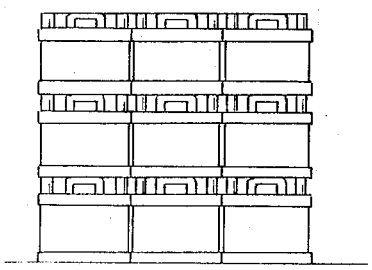

BATTERY HOUSING WITH HANDLE FOR STACKING

The present invention is directed toward the art of batteries and, more particularly, to an improved battery casing for automotive-type wet cell storage batteries.

Typical automotive-type wet cell batteries currently on the market comprise a molded plastic casing or housing which holds the plates and electrolyte. The housing is generally rectangular in shape. Normally, the necessary terminal posts and the vent opening covers extend outwardly above the top wall.

The structure of the batteries is such that they are both heavy and awkward to handle. Additionally, because of their construction, they must be stored in an upright position. The arrangement of the vent covers and terminals, however, makes it difficult - if not possible - to stack a number of batteries. As a consequence, both handling and storage of the batteries are a problem.

The prior art has proposed partial solutions of a less than completely satisfactory nature to the above-mentioned problems. For example, removable handle straps connectible to the terminal posts have been used. Also, certain types of handles have been removably or permanently affixed to the ends of the casing. Additionally, various types of shipping cartons and containers have been proposed. None of these solutions have solved the problems involved without substantially increasing the casings' cost, size, and/or manufacturing difficulties.

The subject invention provides a battery housing construction which overcomes the majority of the above-mentioned problems. Battery cases formed in accordance with the invention are much easier to handle and can be stacked to substantial heights for storage or shipment. Additionally, the use of the invention does not normally increase the overall size or cost of the case.

In general, the invention contemplates a battery casing having a top, bottom, side and end walls. Extending outwardly from the top wall are at least a pair of terminal posts and at least one vent cover. Also, extending outwardly from the top wall is a handle including an upper body portion spaced from the top wall to define a finger receiving recess. The top surface of the upper body portion is substantially at the same elevation as the tops of the terminal posts. Additionally, the handle and the terminal posts are located such that their top surfaces define three nonaligned support surfaces spaced such that the bottom wall of a second battery of similar configuration can be rested thereon and supported on the tops of the handle and terminal posts with substantial stability.

Preferably, the casing is formed of plastic and the handle is molded integrally with the top wall. This arrangement simplifies manufacture and provides a strong handle.

As can be appreciated, the handle structure itself can have many different shapes and configurations. Further, it can be positioned at a range of locations. Preferably, however, if a single handle is used, it should be located generally centrally of the top wall; i.e., above the center of gravity of the battery. Also, as noted earlier, the top surface of the handle should be at substantially the same elevation as the tops of the terminal posts. If more than one handle is used, they can satisfactorily be positioned at other locations; however, they should have their top surfaces no higher than the top surface of the terminal posts.

Accordingly, a primary object of the invention is the provision of a battery case construction wherein a carrying handle is formed integrally with the top of the case and positioned so that in combination with the terminal posts it defines a generally flat support surface on which a second battery of similar construction can be rested.

Yet another object of the invention is the provision of a battery of the general type described wherein the handle-defining member is formed integrally with the casing and has an elevation no greater than the elevation of the terminal posts, vent covers, and the like.

Still another object of the invention is the provision of a battery having a handle structure wherein the handle is located such that it will not interfere with the normal functioning or use of the battery.

The above and other objects and advantages will become apparent from the following description when read in conjunction with the accompanying drawings wherein:

FIG. 1 is a pictorial view of a battery incorporating features of the subject invention;

FIG. 2 is a front elevation of the battery shown in FIG. 1;

FIG. 3 is a partial cross-section view through the handle portion of the battery of FIG. 1 (FIG. 3 is taken on line 3—3 of FIG. 1); and, FIG. 4 is a somewhat diagrammatic view which illustrates how batteries formed in accordance with the invention can be stacked during storage or shipment.

Referring more particularly to FIG. 1, the overall arrangement of a battery incorporating the subject invention is shown in pictorial form. In general, the battery is identified with the numeral 10 and includes a casing 12 having a bottom wall 14, opposed, generally parallel side walls 16, and end walls 18. The casing further includes a top wall forming member 20. Generally, although not of major importance to the invention, the casings are molded in two or more pieces from a suitable plastic and bonded together. Typically, the lower portion including the vertically extending side and end walls would be molded as a single piece and thereafter the necessary internal portions of the battery including the plates, cell-dividing walls, and the like would be inserted and the top member bonded thereto.

The actual structural shape of the housing and the particular plastic on which it is formed are not of particular importance to the subject invention. Any typical construction used for automotive-type wet cell storage batteries could be used. In the subject embodiment, the top wall 20 is shown as including downwardly extending side wall portions 22 which are bonded to the tops of the vertically extending side and end walls 16, 18, respectively. The top wall could, however, be a single flat section received within the open upper end of the battery.

Extending upwardly through the top wall 20 are a pair of electrically conductive terminal posts 24 and 26. Terminal posts 24, 26, of course, are suitably connected with the plates and the battery internals in a customary manner (not shown). Also carried from the top wall 20 are removable vent covers 28 and 30. Covers 28 and 30 provide access to the vent and fill openings of the cells. As is standard, each of the covers 28 and 30 are removably connected to the top so that removal of one will provide access to several of the cells.

In the embodiment under consideration, the top surfaces of the terminal posts 24, 26 and the vent covers 28, 30 are preferably located at substantially the same elevation for reasons which will subsequently be discussed.

One aspect of particular importance to the subject invention is the provision of a handle means 32. As will become apparent, the handle means 32 could have a variety of different structures, configurations, and be located at a substantial number of different spots on the top of the casing 12. Preferably, however, handle means 32 (as best shown in FIGS. 1–3) is formed integrally with the top 20 and comprises an upper horizontally extending portion 34 and a pair of downwardly extending end portions 36. This defines a central recess or opening 38 which is preferably sized so as to be capable of receiving the human hand. As noted, the handle means 32 is preferably formed integrally with the top 20 in the same molding operation so that the resulting handle top structure is comparatively strong and rigid. Additionally, it should be noted that, as best shown in FIG. 2, the top surface 39 of the handle means 32 is at substantially the same elevation as the top surfaces of the terminal posts 24, 26. Thus, the top of the handle and the terminal posts define a plane. Moreover, as will subsequently become apparent, the handle and terminal posts as well as the vent covers should preferably be spaced such that a second battery of generally similar construction can be rested thereon with its bottom wall supported by the tops of the various members; i.e., the terminal posts, handle and vent covers. FIG. 4 illustrates how batteries of the subject invention can be stacked to a substantial height limited primarily by the strength of the casing itself.

Additionally, it should be understood that if a single handle means 32 is provided, it should preferably be located generally in alignment with the center of gravity of the battery to facilitate carrying and handling with the handle member 32. Alternately, however, if two of the handles are provided, they could be located at other positions such that a balanced condition is provided for carry.

Further, although the invention has been described and illustrated with all the terminal posts, handle, and vent covers at the same elevation, it should be appreciated that, for example, depending upon the location of the terminal posts and/or handle, the vent covers themselves could be at a lower elevation and not relied upon for use as a support surface. It is preferable, however, that the terminal posts and handle have a common elevation and be used as the support defining members. This is because of their inherently greater structural strength.

The subject device can take a variety of other configurations from that shown. For example, the handle 32 could extend transversely of the battery as opposed to longitudinally in the manner shown. Similarly, if desired, or if necessary for other reasons, the terminal posts could be located in other locations on the battery.

It should be understood that by providing a handle member as shown, the overall size, shape, and general configuration of the battery is not modified. Thus, as opposed to handles located at the sides or ends of the battery, the overall space required for mounting or storing the battery is not increased. Similarly, the complexity of the molding operation is not increased to any substantial amount and, consequently, the overall cost of the battery remains approximately the same even with the addition of the handle means 32.

The invention has been described in great detail sufficient to enable one of ordinary skill in the art to make and use the same. Obvious modifications and alterations will occur to others upon a reading and understanding of the specification and it is our intention to include all such modifications and alterations as part of our invention insofar as they come within the scope of the appended claims.

We have thus described our invention.

What is claimed is:

1. An improved battery casing for automotive-type wet cell storage batteries comprising a generally rectangular molded housing including a bottom wall, vertically extending side and end walls, and a generally horizontal top wall;

at least a pair of terminal posts spaced on said top wall and extending upwardly therefrom and terminating in upper top surfaces;

at least one rigid handle member rigidly connected to and extending outwardly from said top wall, said handle member having an upper body portion spaced from the top wall to define a finger-receiving recess, said upper body portion having a top surface; and, said handle and said terminal posts being located such that their top surfaces define at least three nonaligned support surfaces spaced apart and defining a plane parallel with the bottom wall of said casing and the bottom wall of a second battery casing to form means for engaging the bottom wall of said second battery casing of similar configuration rested in alignment thereon to be supported on the tops of the handle and the terminal posts with substantial stability.

2. The casing as defined in claim 1 wherein said handle is molded integrally in one piece with said top wall.

3. The casing as defined in claim 1 wherein said handle is located generally in alignment with the center of gravity of said casing.

4. A battery casing as defined in claim 1 including at least one vent cover member extending upwardly from the top wall of said casing and having a top surface located in said plane.

5. The casing as defined in claim 1 wherein said handle member extends generally longitudinally of said casing.

* * * * *